US009897009B2

(12) United States Patent
Strong et al.

(10) Patent No.: US 9,897,009 B2
(45) Date of Patent: Feb. 20, 2018

(54) FLEXIBLE THERMAL BLANKET

(71) Applicant: United Technologies Corporation, Hartford, CT (US)

(72) Inventors: Paul E. Strong, Bristol, CT (US); Younus Ahmed, Hartford, CT (US); William Bogue, Hebron, CT (US); Michael Chrysosferidis, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 52 days.

(21) Appl. No.: 15/017,978

(22) Filed: Feb. 8, 2016

(65) Prior Publication Data

US 2017/0226930 A1  Aug. 10, 2017

(51) Int. Cl.

| B32B 3/06 | (2006.01) |
|---|---|
| F02C 7/24 | (2006.01) |
| F02C 7/22 | (2006.01) |
| B32B 3/26 | (2006.01) |
| B32B 5/02 | (2006.01) |

(Continued)

(52) U.S. Cl.
CPC ............. *F02C 7/24* (2013.01); *B32B 3/06* (2013.01); *B32B 3/266* (2013.01); *B32B 5/024* (2013.01); *B32B 5/26* (2013.01); *B32B 7/08* (2013.01); *B32B 7/12* (2013.01); *B32B 9/005* (2013.01); *B32B 9/047* (2013.01); *F02C 7/222* (2013.01); *B32B 2255/205* (2013.01); *B32B 2260/021* (2013.01); *B32B 2260/046* (2013.01); *B32B 2262/101* (2013.01); *B32B 2262/105* (2013.01); *B32B 2307/304* (2013.01); *B32B 2307/7265* (2013.01); *B32B 2571/00* (2013.01); *B32B 2605/18* (2013.01)

(58) Field of Classification Search
CPC ............ Y10T 428/24017; F16L 59/029; F16L 59/106; F16L 59/161; F16L 59/168; B32B 3/06
See application file for complete search history.

(56) References Cited

U.S. PATENT DOCUMENTS

| 2,175,948 A | 10/1939 | Adams |
|---|---|---|
| 2,719,099 A | 9/1955 | Holbrook |

(Continued)

FOREIGN PATENT DOCUMENTS

DE   202009013078   4/2010

OTHER PUBLICATIONS

A-B Thermal Technologies, "High Temperature Removable Blankets and Insulation for Engines & Generators", available from <http://www.firesleeveandtape.com/high-temperature-pipe-exhaust-muffler-engine-removable-insulation-blankets-covers.html>, Dec. 14, 2015.

(Continued)

*Primary Examiner* — Alexander Thomas
(74) *Attorney, Agent, or Firm* — O'Shea Getz P.C.

(57) ABSTRACT

Aspects of the disclosure are directed to a flexible thermal blanket assembly, comprising: a stack-up of material layers that are configured to wrap around a component, a plurality of snaps configured to be mechanically fastened through the material layers, and a cap configured as a baffle to prevent thermal energy located at an exterior of the thermal blanket assembly from entering an interior of the thermal blanket assembly when the thermal blanket assembly is assembled.

20 Claims, 5 Drawing Sheets

(51) Int. Cl.
  *B32B 5/26*   (2006.01)
  *B32B 7/08*   (2006.01)
  *B32B 7/12*   (2006.01)
  *B32B 9/00*   (2006.01)
  *B32B 9/04*   (2006.01)

(56) References Cited

U.S. PATENT DOCUMENTS

| | | | | |
|---|---|---|---|---|
| 3,557,840 | A | * | 1/1971 | Maybee ................ F16L 59/026 138/149 |
| 3,589,971 | A | | 6/1971 | Sheridan |
| 4,807,669 | A | | 2/1989 | Prestidge, Sr. |
| 5,169,025 | A | | 12/1992 | Guo |
| 5,357,659 | A | * | 10/1994 | Ackermann ............ A41H 37/04 24/114.4 |
| 5,654,060 | A | | 8/1997 | Holman |
| 5,985,362 | A | | 11/1999 | Specht |
| 6,230,501 | B1 | | 5/2001 | Bailey |
| 7,947,354 | B2 | * | 5/2011 | Pirogovsky ........... F16L 59/168 138/149 |
| 8,172,938 | B2 | | 5/2012 | Alright |
| 8,397,738 | B2 | | 3/2013 | Livacich |
| 2005/0208851 | A1 | | 9/2005 | Gooliak |
| 2014/0065357 | A1 | | 3/2014 | Richardson |
| 2014/0133964 | A1 | | 5/2014 | Ayle |
| 2015/0260329 | A1 | * | 9/2015 | Bond .................... F16L 59/029 428/35.2 |

OTHER PUBLICATIONS

Eric Christiansen, "Smart MMOD Thermal Blanket", Lyndon B. Johnson Space Center, Houston, Texas, available from: <http://www.techbriefs.com/component/content/article/ntb/tech-briefs/materials/23211#I>, Dec. 14, 2015.

Industrycortex.com, "High Temperature Insulation Blanket", available from: <http://www.industrycortex.com/datasheets/results/high-temperature-insulation-blanket?per_page=340>, Dec. 14, 2015.

EP search report for EP17155063.5 dated May 31, 2017.

* cited by examiner

FLEXIBLE THERMAL BLANKET

BACKGROUND

On an aircraft, thermal blankets are used to protect engine components from excessive thermal energy. For example, thermal blankets are used to mitigate the thermal energy and protect critical engine components that allow the engine to operate safely and reliably.

The use of such thermal blankets may be required by various laws, rules, or regulations. The design of a thermal blanket, including the materials and fabrication methods that are used, may dictate the efficacy of the thermal blanket in terms of reducing the impact of thermal energy on the engine.

Still further, thermal blankets may be used in areas of an engine where accessibility is limited. In the event that a maintenance or repair procedure needs to be conducted on the thermal blanket or a component of the engine, the thermal blanket requires a mechanism to facilitate its removal. On the other hand, there is a need to ensure the integrity of the thermal blanket when it is installed/deployed in order to provide for the management/mitigation of thermal energy as described above.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a flexible thermal blanket assembly, comprising: a stack-up of material layers that are configured to wrap around a component, a plurality of snaps configured to be mechanically fastened through the material layers, and a cap configured as a baffle to prevent thermal energy located at an exterior of the thermal blanket assembly from entering an interior of the thermal blanket assembly when the thermal blanket assembly is assembled. In some embodiments, the cap includes a plurality of sections. In some embodiments, at least one of the sections includes a miter joint. In some embodiments, the cap is coupled the material layers via at least one of an adhesive or a stitch. In some embodiments, the material layers include a hole formed therein that is configured to seat at least one of a plug or a seal. In some embodiments, the thermal blanket assembly further comprises a sensor located in the interior of the thermal blanket assembly. In some embodiments, the sensor is configured to measure at least one of a fluid flow, a temperature, and a pressure. In some embodiments, the thermal blanket assembly further comprises a strap that is configured to at least partially cover a split line, the split line formed from a first end of the thermal blanket assembly to the hole. In some embodiments, a first end of the strap is attached to the material layers via at least one of an adhesive or a stitch, and a second end of the strap includes a snap. In some embodiments, the thermal blanket assembly further comprises at least one wear protection plate located in the interior and on a surface of the material layers. In some embodiments, the thermal blanket assembly further comprises at least one marking protection plate located on the exterior that is configured to identify the location of the at least one wear protection plate. In some embodiments, the material layers include: a silicone-impregnated aluminized fiberglass layer, a ceramic layer, and an insulation layer. In some embodiments, the material layers include: a fiberglass layer disposed between the aluminized fiberglass layer and the ceramic layer. In some embodiments, the aluminum fiberglass layer includes a silicone coating, and the material layers include a calendared ceramic. In some embodiments, at least two of the material layers are bonded to one another or are coupled to one another via an adhesive and a primer. In some embodiments, the material layers are coupled to one another via at least one stitched thread. In some embodiments, the insulation layer has a thickness of at least $3/16$ inches. In some embodiments, the thermal blanket assembly further comprises at least one vent hole formed in the material layers, and a mesh over the at least one vent hole, the mesh configured to prevent debris from entering the thermal blanket assembly. In some embodiments, at least one of the snaps is hollow and includes locking-wire. In some embodiments, the thermal blanket assembly further comprises the component, where the component includes a non-metallic seal associated with a fuel pump adapter.

BRIEF DESCRIPTION OF THE DRAWINGS

The present disclosure is illustrated by way of example and not limited in the accompanying figures in which like reference numerals indicate similar elements. The drawing figures are not necessarily drawn to scale.

DETAILED DESCRIPTION

Figure 1:
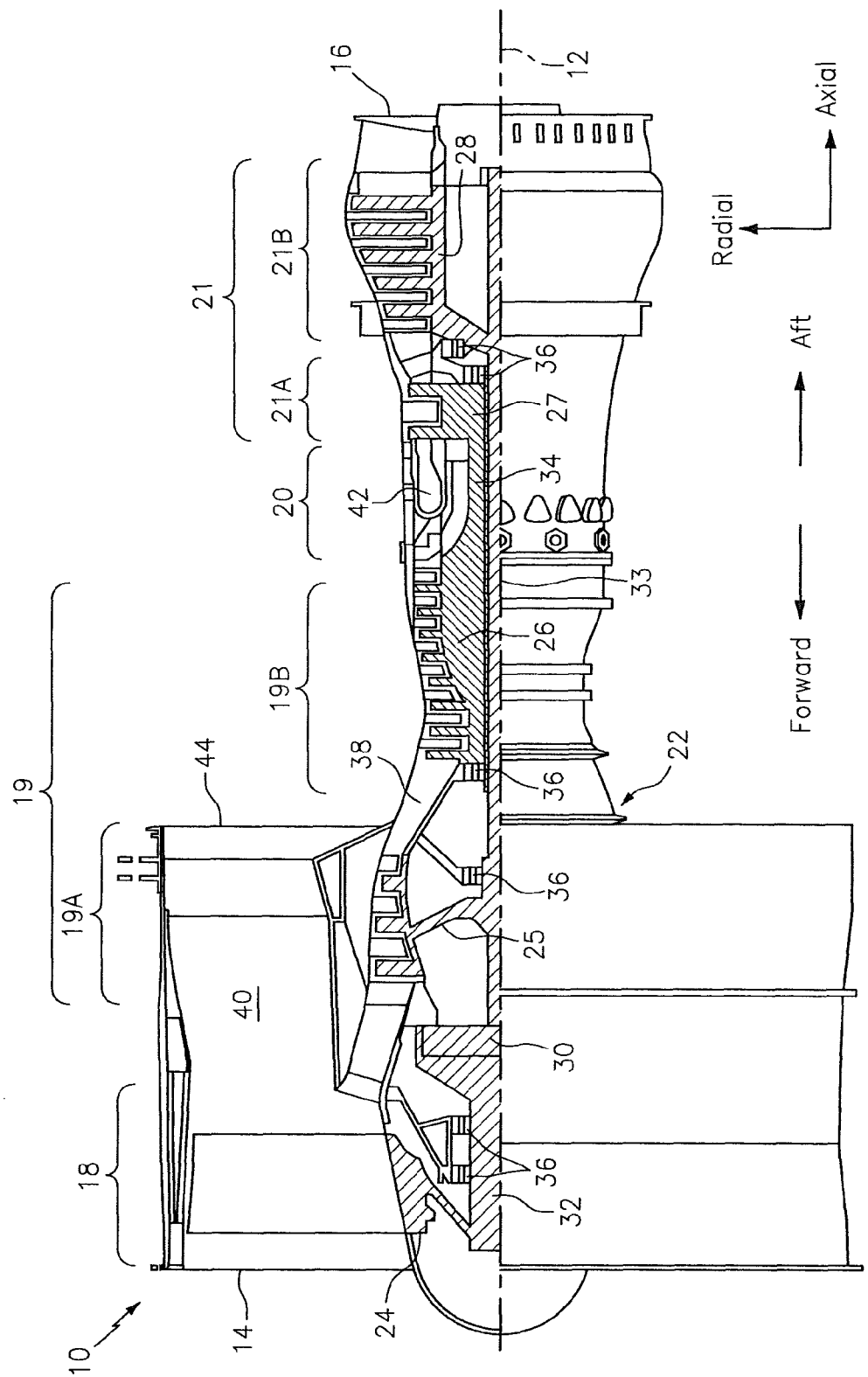
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a thermal blanket. In some embodiments, various portions or regions of the thermal blanket may be configured to withstand one or more temperatures for one or more periods of time; such capability may be based on materials that are used in the construction of the thermal blanket. The thermal blanket may include components/features that enable the thermal blanket to interface to other components without subjecting the thermal blanket to degradation or wear. Components/features may facilitate installation, removal, or replacement of the thermal blanket and/or facilitate a maintenance or repair activity to be performed on a component of an engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 2:
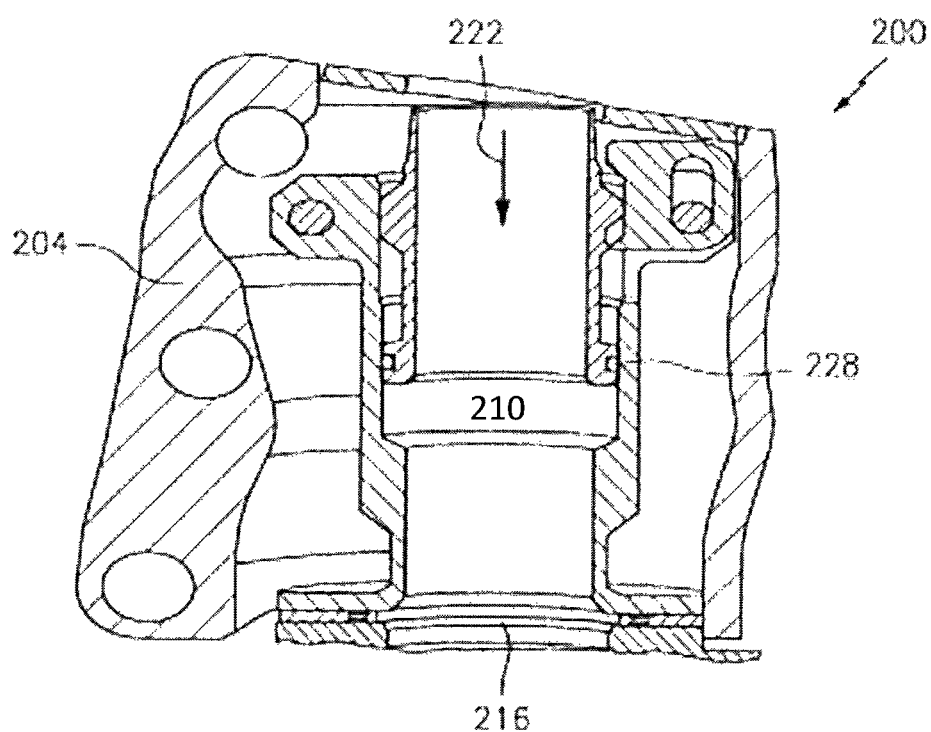
FIG. 2 illustrates a portion of a thermal blanket in proximity to an adapter and a portion of a fuel pump in accordance with aspects of the disclosure.

Referring now to FIG. 2, a system environment 200 is shown. The system 200 may be included as part of an engine, such as for example the engine 10 of FIG. 1.

The system 200 may include a thermal blanket 204. When in an installed/assembled configuration, the thermal blanket 204 may house (e.g., wrap around) an adapter 210 and at least a portion of a fuel pump 216. Arrow 222 represents a fluid (e.g., fuel) flow direction when the pump 216 is operative/active/on. The thermal blanket 204 may be used to protect one or more components (e.g., an o-ring seal 228, a fluorocarbon seal, a fluoroelastomer seal, a fluorosilicone seal, a non-metallic seal, etc.) from being exposed to elevated temperatures, such as for example temperatures in excess of 900 degrees Fahrenheit (approximately 482 degrees Celsius) for a time duration of approximately fifteen minutes.

Figure 3A:
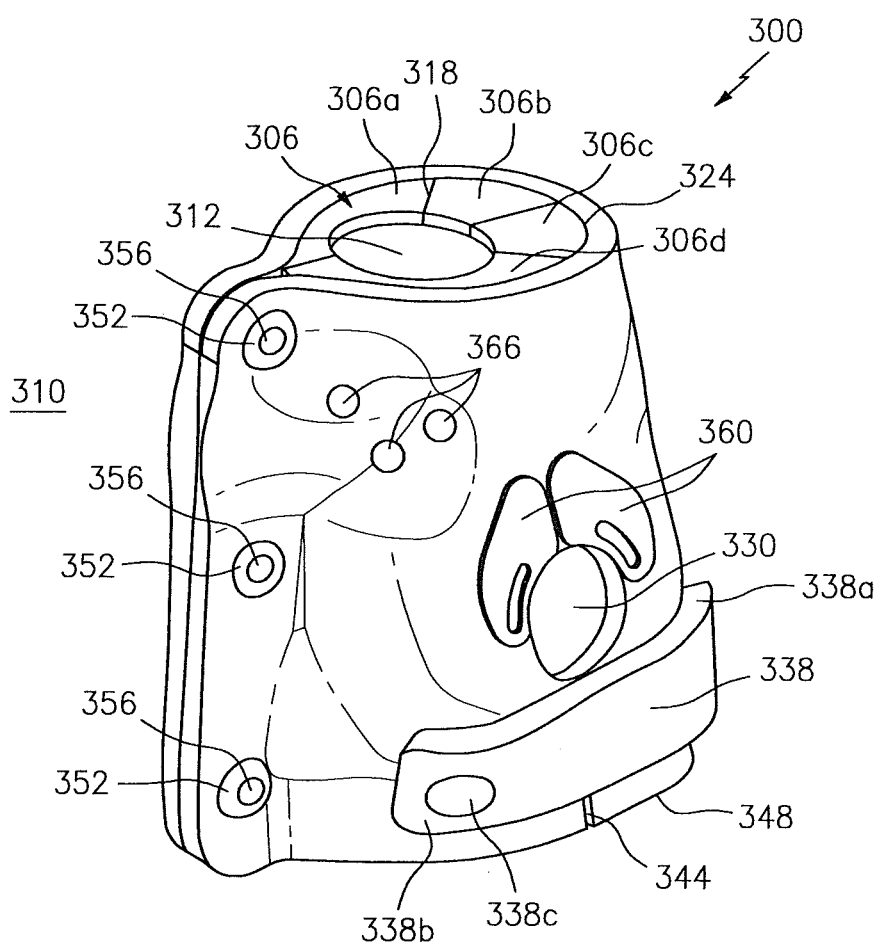
FIG. 3A illustrates a thermal blanket in an installed or assembled configuration in accordance with aspects of this disclosure.

Referring now to FIG. 3A, a thermal blanket/blanket assembly 300 is shown. The thermal blanket 300 may be included as part of an engine, such as for example the engine 10 of FIG. 1. The thermal blanket 300 may correspond to the thermal blanket 204 described above.

The thermal blanket 300 may include a cap 306. The cap 306 may be configured as a baffle to prevent excessive thermal energy (e.g., a flame) located at the exterior 310 of the thermal blanket from entering an interior 312 of the thermal blanket 300. The cap 306 may include one or more sections (e.g., sections 306a, 306b, 306c, and 306d). The use of the sections may allow the thermal blanket 300 to unfold to a flat configuration when, e.g., the thermal blanket is disassembled/removed/uninstalled. When in the assembled configuration as shown, the sections may overlap with one another to obtain full coverage.

Figure 3B:
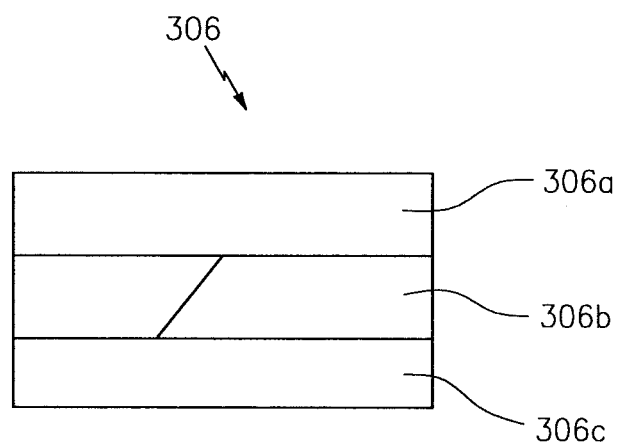
FIG. 3B illustrates details of a cap associated with the thermal blanket of FIG. 3A in accordance with aspects of this disclosure.

Referring to FIGS. 3A-3B, in some embodiments the interface(s) 318 between or associated with the sections 306a-306d may include a miter joint, lap joint, butt joint, etc. to ensure that there is overlap between the sections in the assembled position. Such interfaces (e.g., miter joint) may ensure that one or more surfaces are covered (e.g., prevent flame intrusion) while still allowing for tolerance variations. Otherwise, tolerances would drive either gaps (which could allow flame thru) or bulging (when the caps fit with a tight fit) that could cause the caps to have a tendency to open in use (which would also allow for flame to get thru the blanket).

Around the perimeter 324 of the cap 306 where the cap 306 meets the rest of the thermal blanket 300 application of one or more attachment techniques may be used. For example, the cap 306 may be attached via stitching with fire resistant thread at a minimum. This ensures that in the event of a fire, the cap elements will still remain attached to the main blanket body. Additional methods such as application of an adhesive, interleaving, etc., may be used.

Within the body of the thermal blanket 300 one or more holes (e.g., hole 330) may be formed. The hole 330 may accommodate a plug (not shown) that may be inserted into the hole 330 following a manufacture/assembly of the thermal blanket 300. The plug may be used to seal the interior 312 of the thermal blanket 300 when the thermal blanket is, e.g., shipped. Thereafter, such as for example during preparations for installing the thermal blanket 300 on an engine, the plug may be removed and a sensor (not shown) may be installed within the interior 312 of the thermal blanket. The sensor may be configured to measure one or more parameters, such as for example a fluid flow (e.g., a fuel flow), temperature, pressure, etc. In some embodiments, the adapter 210 includes a protruding female connection that occupies the hole 330. The sensor that goes into the female connection may protrude outward of hole 330.

The thermal blanket 300 may include a strap 338. When the thermal blanket 300 is in the installed/assembled configuration shown in FIG. 3A, the strap 338 may at least partially cover a split line 344 formed from a first end (e.g., a bottom) 348 of the thermal blanket 300 to the hole/plug 330. The combination of the strap 338 and the split line 344 may facilitate installation/removal of the sensor described above, or an inspection or maintenance activity within at least a portion of the interior 312 of the thermal blanket 300, without necessitating a complete removal of the thermal blanket 300 or surrounding hardware.

A first end 338a of the strap 338 may be attached to the remainder of the thermal blanket 300 via, e.g., stitching, application of an adhesive, etc. A second end 338b of the strap 338 may incorporate a snap 338c that may be snapped for use on the engine or unsnapped to facilitate, e.g., maintenance, inspection, or installation of a sensor as described above.

The thermal blanket 300 may include one or more snaps 352 (illustratively, three such snaps 352 are shown in FIG. 3A). The snaps 352 may be used to selectively install or remove the thermal blanket 300. The snaps 352 may be mechanically fastened through some or all of the layers of the thermal blanket 300 at each of the respective snap locations. The snaps 352 may be made of one or more materials, such as for example a stainless steel.

In some embodiments, installation and removal forces as each snap 352 location may be specified in terms of an allowable range. For example, the snaps may have forces ranging from 1 pound-force (approximately 4.4 Newtons) (minimum) to 6 pounds-force (approximately 26.7 Newtons) (maximum). Specification of such a range may ensure that the snaps 352 do not inadvertently become loose when the thermal blanket is assembled/installed while still allowing for ease in use/deployment.

In some embodiments, a snap 352 may be hollow/include a through-hole 356 going through an axis of a male-female interface of the snap 352. The through-hole 356 may accommodate snap-to-snap installation/attachment with the use of locking-wire or safety wire.

In some embodiments, the thermal blanket 300 may include one or more wear plates. The wear plates may be located on the cold, interior 312 side of the thermal blanket 300. The wear plates may prevent degradation/wear of the (interior of the) thermal blanket 300 due to potential interaction (e.g., rubbing) with one or more components (e.g., a safety wire, locking-wire, etc.) housed within the interior. On the hot, exterior 310 side of the thermal blanket 300 one or more marking plates 360 may be included, where the marking plates 360 may serve as respective counterparts to the wear plates and may serve to identify the locations of the wear plates from the exterior 310 of the thermal blanket. The marking plates 360 may also provide additional protection against tooling wear.

During engine operation, the blanket assembly 300 may experience elevated pressure within the assembly itself due to outgassing at elevated temperatures. To alleviate the potential build-up of pressure, one or more vent holes (represented schematically via reference character 366) may be included in the thermal blanket 300. The precise locations of the vent holes 366 may be selected to minimize the likelihood for any nearby fluid to contact the vent holes 366. In some embodiments, the vent holes 366 may be covered with a fine, breathable mesh to prevent debris from entering the blanket assembly 300. Parameters (e.g., count, size/dimension, shape/geometry) of the vent holes 366 may be selected to provide for a predetermined amount/degree of pressure relief.

Figure 4:
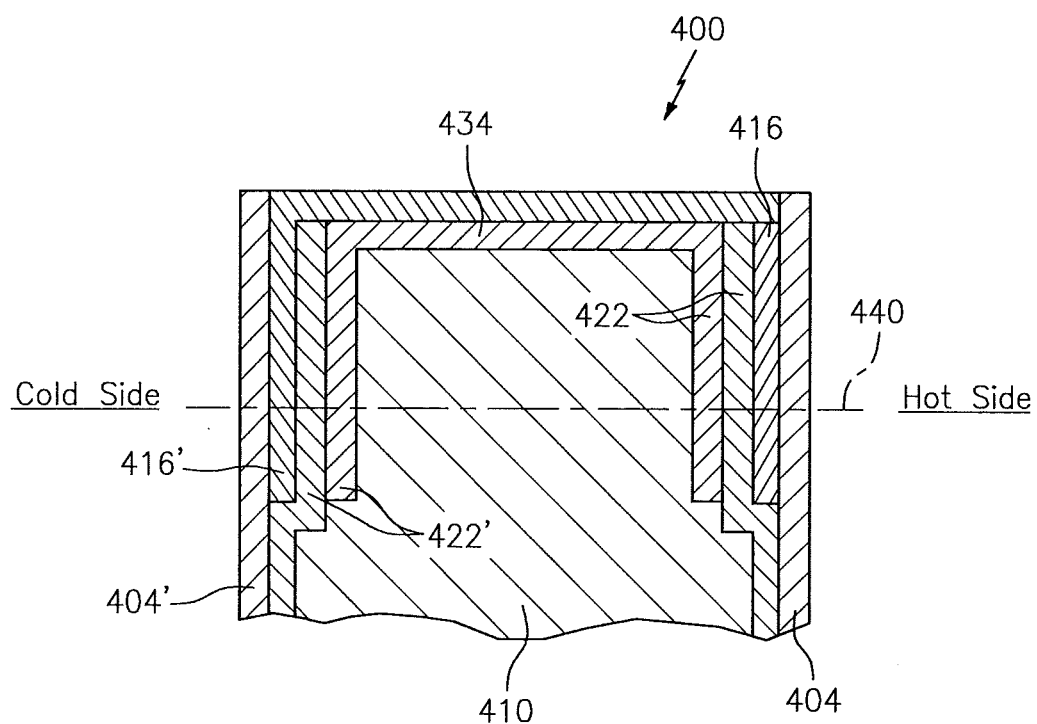
FIG. 4 illustrates a stack-up of layers used in the construction of a thermal blanket in accordance with aspects of the disclosure.

Referring to FIG. 4, a stack-up of layers of material that may be used to construct a thermal blanket 400 (which may correspond to one or more of the other thermal blankets described herein) is shown. The progression of the layers from the hot, exterior side of the thermal blanket 400 to the cold, interior side of the thermal blanket 400 (when the thermal blanket 400 is in an assembled/installed configuration) is shown in FIG. 4 in a right-to-left manner.

The layer 404 may be an aluminized silicone-coated fiberglass. The fiberglass matrix may provide sustenance to other layers at intermittent exposure temperatures up to, e.g., 600° F. (approximately 316° C.) and/or continuous exposure up to 500° F. (approximately 260° C.), while the aluminized feature of the layer 404 may provide a reflective surface that can prevent thermal energy entrance due to irradiation. The silicone-coat of the layer 404 may ensure the thermal blanket 400 is splash resistant, which prevents fluid entrainment. Preventing fluid entrainment may avoid compromising the thermal properties of an insulation layer 410.

The insulation layer 410 may form the bulk of the thermal blanket 400. The insulation layer 410 may be made of one or more fibers/fibrous materials. In some embodiments, the materials of the layer 410 may be woven.

Proximate or adjacent the layer 404 there may be a layer 416. The layer 416 may include fiberglass. Layer 416 may be used to provide fabric facing on the edges. The fabric facing layer may be silicone impregnated fiberglass to prevent fluid entrainment on the edges. Layer 416 may be separate from layer 404 to provide ease of manufacturability.

Adjacent the layer 416 there may be one or more layers 422. The layers 422 may include one or more ceramic materials, such as for example a ceramic fiber or woven ceramic textiles. The layers 422 may ensure that in the event of elevated temperatures that the insulation layer 410 remains intact.

Having just described some of the layers that may be included in the thermal blanket 400, and in particular layers that may be proximate the hot side of the thermal blanket 400, in some embodiments the layers that are proximate the cold side may be substantially similar. As an example, proceeding right-to-left (hot-to-cold) in FIG. 4, the thermal blanket 400 may include layers 422', 416', and 404'.

The layer(s) 422' may include one or more ceramic materials.

The layer 416' may include fiberglass.

The layer 404' may include fiberglass and/or aluminized fiberglass. A silicone-coating may be used in connection with the layer 404'.

In some embodiments, at least a portion of the layer 422 and/or the layer 422' may be replaced with a calendared ceramic (silicone and ceramic) as indicated via reference character 434. The use of a calendared ceramic 434 may function as both a seal that may enhance splash resistance and also help mitigate the impact of thermal energy. Furthermore, a calendared ceramic 434 may simplify manufacturing since less (total) material may be needed to implement the same.

The particular counts or types of layers used in connection with the thermal blanket 400 is illustrative. In some embodiments, the counts or types (e.g., materials) used in the construction of a thermal blanket may be different from what is shown in FIG. 4. Still further, additional materials or layers not shown may be included and one or more of the layers that are shown may be optional.

In some embodiments, two layers may be coupled to one another via one or more attachment techniques. For example, one or more adhesives, a bonding technique, etc., may be applied to couple the layers together. A primer may be applied to prepare the surfaces of such layers.

In some embodiments, two or more of the layers may also be coupled to one another via application of a stitching as indicated by reference character 440. One or more threaded materials may be used to provide for such stitching 440. The thread may traverse some or all of the layers of the thermal blanket 400. To the extent that stitching 440 is used, the amount of stitching at the outermost layers (e.g., layers 404 and 404') may be minimized to the extent practical so as to avoid have too many locations where fluids can enter and compromise the properties (e.g., the protection) of the thermal blanket 400. Stitching 440 may also be applied as close to the perimeter edges of the thermal blanket 400 so as to minimize the likelihood of the thermal blanket 400 fraying.

The particular shape or dimension of a thermal blanket that is used may be based on one or more conditions or factors, such as for example considerations of an environment where the thermal blanket will be used and/or a component that the thermal blanket is intended to protect. A flat pattern orientation may facilitate ease in manufacture of the thermal blanket. Alternatively, the thermal blanket may be molded to the contours/dimensions of the component that the thermal blanket is intended to protect in order to enhance the protection that is provided by the thermal blanket.

Technical effects and benefits of this disclosure include the provisioning of a thermal blanket that may be used to mitigate the impact of a rapid oxidation event. Due to space constraints, the thermal blanket (or an insulation associated therewith) may have a thickness of as little as $3/16$ inches (approximately 4.8 millimeters). The thermal blanket (or an insulation associated therewith) may have a thermal conductivity of approximately 1.06 BTU*in/(hr*ft$^2$*° F.) (approximately 1.53 mW/(cm*° C.)) or less, such that thermal blanket may be able to endure five minutes of exposure to a temperature of 2000° F. (approximately 1093° C.) on a hot, exterior side, where the temperature may be reduced to 600° F. (approximately 316° C.) on the cold, interior side of the thermal blanket. This reduction in temperature on the cold, interior side may be used to protect one or more components, such as for example a component of an aircraft or aircraft engine. The thermal blanket may be flexible, allowing the thermal blankets to be at least partially deformed. Such deformation/flexibility may allow the thermal blanket to be installed in areas/spaces/regions of an engine that are difficult to access or are surrounded by various components.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A flexible thermal blanket assembly, comprising:
   a stack-up of material layers that are configured to wrap around a component;
   a plurality of snaps configured to be mechanically fastened through the material layers; and
   a cap configured as a baffle to prevent thermal energy located at an exterior of the thermal blanket assembly from entering an interior of the thermal blanket assembly when the thermal blanket assembly is assembled, wherein the material layers include:
      a silicone-impregnated aluminized fiberglass layer;
      a ceramic layer; and
      an insulation layer.

2. The thermal blanket assembly of claim 1, wherein the cap includes a plurality of sections.

3. The thermal blanket assembly of claim 2, wherein at least one of the sections includes a miter joint.

4. The thermal blanket assembly of claim 1, wherein the cap is coupled to the material layers via at least one of an adhesive or a stitch.

5. The thermal blanket assembly of claim 1, wherein the material layers include a hole formed therein that is configured to seat at least one of a plug or a seal.

6. The thermal blanket assembly of claim 5, further comprising:
   a sensor located in the interior of the thermal blanket assembly.

7. The thermal blanket assembly of claim 6, wherein the sensor is configured to measure at least one of a fluid flow, a temperature, and a pressure.

8. The thermal blanket assembly of claim 5, further comprising:
   a strap that is configured to at least partially cover a split line, the split line formed from a first end of the thermal blanket assembly to the hole.

9. The thermal blanket assembly of claim 8, wherein a first end of the strap is attached to the material layers via at least one of an adhesive or a stitch, and wherein a second end of the strap includes a snap.

10. The thermal blanket assembly of claim 1, further comprising:
    at least one wear protection plate located in the interior and on a surface of the material layers.

11. The thermal blanket assembly of claim 1, wherein the material layers include:
    a fiberglass layer disposed between the aluminized fiberglass layer and the ceramic layer.

12. The thermal blanket assembly of claim 1, wherein the aluminum fiberglass layer includes a silicone coating, and wherein the material layers include a calendared ceramic.

13. The thermal blanket assembly of claim 1, wherein at least two of the material layers are bonded to one another or are coupled to one another via an adhesive and a primer.

14. The thermal blanket assembly of claim 1, wherein the material layers are coupled to one another via at least one stitched thread.

15. The thermal blanket assembly of claim 1, wherein the insulation layer has a thickness of at least $3/16$ inches.

16. The thermal blanket assembly of claim 1, further comprising:
    at least one vent hole formed in the material layers; and
    a mesh over the at least one vent hole, the mesh configured to prevent debris from entering the thermal blanket assembly.

17. The thermal blanket assembly of claim 1, wherein at least one of the snaps is hollow and includes locking-wire.

18. The thermal blanket assembly of claim 1, further comprising:
    the component,
    wherein the component includes a non-metallic seal associated with a fuel pump adapter.

19. A flexible thermal blanket assembly, comprising:
    a stack-up of material layers that are configured to wrap around a component;
    a plurality of snaps configured to be mechanically fastened through the material layers;
    a cap configured as a baffle to prevent thermal energy located at an exterior of the thermal blanket assembly from entering an interior of the thermal blanket assembly when the thermal blanket assembly is assembled; and
    a sensor located in the interior of the thermal blanket assembly, wherein the material layers include a hole formed therein that is configured to seat at least one of a plug or a seal.

20. A flexible thermal blanket assembly, comprising:
a stack-up of material layers that are configured to wrap around a component;
a plurality of snaps configured to be mechanically fastened through the material layers;
a cap configured as a baffle to prevent thermal energy located at an exterior of the thermal blanket assembly from entering an interior of the thermal blanket assembly when the thermal blanket assembly is assembled; and
at least one wear protection plate located in the interior and on a surface of the material layers.

* * * * *